United States Patent
Salvacion

(10) Patent No.: US 11,242,077 B2
(45) Date of Patent: Feb. 8, 2022

(54) DOLLY FOR LADDERS AND OTHER OBJECTS

(71) Applicant: Odilon Salvacion, Henderson, NV (US)

(72) Inventor: Odilon Salvacion, Henderson, NV (US)

(*) Notice: Subject to any disclaimer, the term of this patent is extended or adjusted under 35 U.S.C. 154(b) by 0 days.

(21) Appl. No.: 16/835,350

(22) Filed: Mar. 31, 2020

(65) Prior Publication Data
US 2020/0331509 A1    Oct. 22, 2020

Related U.S. Application Data

(60) Provisional application No. 62/834,966, filed on Apr. 17, 2019.

(51) Int. Cl.
*B62B 3/02* (2006.01)
*B62B 3/10* (2006.01)
*B62B 5/06* (2006.01)

(52) U.S. Cl.
CPC ............ *B62B 3/02* (2013.01); *B62B 3/102* (2013.01); *B62B 5/06* (2013.01); *B62B 2202/48* (2013.01); *B62B 2206/06* (2013.01)

(58) Field of Classification Search
CPC .. B62B 3/02; B62B 3/102; B62B 5/06; B62B 2206/06; B62B 2202/48
See application file for complete search history.

(56) References Cited

U.S. PATENT DOCUMENTS

| | | | | |
|---|---|---|---|---|
| 3,762,739 A * | 10/1973 | Tabet | ........................ | B62B 3/02 280/47.371 |
| 3,807,750 A * | 4/1974 | Brown | ........................ | B62B 3/02 280/35 |
| 3,998,476 A * | 12/1976 | Kazmark, Sr. | .......... | B62B 1/125 280/655 |
| 4,274,644 A * | 6/1981 | Taylor | ....................... | B62B 3/02 280/39 |
| 5,090,725 A * | 2/1992 | Feldner | ..................... | B62B 3/02 211/189 |
| 5,190,305 A * | 3/1993 | Putman | ..................... | B62B 3/10 211/182 |
| 5,464,244 A * | 11/1995 | Tsai | ........................ | B62B 1/125 280/47.24 |
| 6,505,844 B2 * | 1/2003 | Hallman | .................. | B62B 3/108 118/500 |
| 6,877,764 B2 * | 4/2005 | Sagol | ........................ | B62B 5/06 280/47.371 |
| 7,219,904 B1 * | 5/2007 | Boom | ........................ | B62B 3/04 280/47.35 |
| 8,342,544 B1 * | 1/2013 | Blewett | ................... | B62B 3/022 280/79.11 |
| 9,440,594 B1 * | 9/2016 | Clamont Bello | ........ | B60R 11/00 |
| D779,145 S * | 2/2017 | Thuma | ........................... | D34/17 |
| 10,086,860 B2 * | 10/2018 | Jian | ........................ | B62B 5/067 |
| 10,376,045 B1 * | 8/2019 | Poudrier | ................. | B62B 3/002 |
| 10,543,592 B2 * | 1/2020 | Esposito | ................ | A47B 31/00 |

(Continued)

*Primary Examiner* — Erez Gurari
(74) *Attorney, Agent, or Firm* — Bayramoglu Law Offices LLC

(57) ABSTRACT

A dolly apparatus, comprising a platform, a plurality of bars coupled with the platform, a handle configured to connect the plurality of bars to each other, and a plurality of casters coupled with the platform. The dolly apparatus has the versatility to accommodate various types and sizes of ladders and transports each of them from one spot to another with relative ease and minimal effort.

15 Claims, 7 Drawing Sheets

(56) References Cited

U.S. PATENT DOCUMENTS

| | | | |
|---|---|---|---|
| 10,543,862 B1* | 1/2020 | Aguirre | B62B 3/02 |
| D875,342 S * | 2/2020 | Tseng | D34/17 |
| D896,462 S * | 9/2020 | Lee | D34/17 |
| 2008/0197592 A1* | 8/2008 | Dukes | B62B 5/06 280/47.34 |
| 2008/0217503 A1* | 9/2008 | Zhuang | B62B 3/02 248/558 |
| 2009/0308706 A1* | 12/2009 | Mao | A45C 9/00 190/8 |
| 2014/0183832 A1* | 7/2014 | Wang | B62B 5/067 280/39 |
| 2015/0203138 A1* | 7/2015 | Hassell | B62B 3/008 280/47.34 |
| 2017/0088155 A1* | 3/2017 | Silva | B62B 3/02 |
| 2017/0129519 A1* | 5/2017 | Uszynski | B62B 3/02 |
| 2018/0118245 A1* | 5/2018 | Chung | B62B 5/0073 |
| 2019/0328093 A1* | 10/2019 | Newman | B62B 3/02 |
| 2020/0207393 A1* | 7/2020 | Song | B62B 3/022 |
| 2020/0307664 A1* | 10/2020 | Song | B62B 3/02 |
| 2020/0369308 A1* | 11/2020 | Mudrick | B62B 3/022 |
| 2021/0053600 A1* | 2/2021 | Wang | B62B 5/0023 |

* cited by examiner

DOLLY FOR LADDERS AND OTHER OBJECTS

CROSS REFERENCE TO RELATED APPLICATIONS

This application is based upon and claims the benefit of U.S. Provisional Application No. 62/834,966, filed on Apr. 17, 2019, the entire contents of which are incorporated herein by reference.

TECHNICAL FIELD

The disclosure relates generally to the technical field of dolly equipment.

BACKGROUND

Building facilities such as high-rise towers, government installations, industrial plants, commercial establishments, etc., maintain a multitude of ladders of varying types, grades, and sizes as standard property equipment for use in the day-to-day operations. Whether to change a light bulb, replace air filters, run electrical wires, investigate ceiling leaks, or work on any height related issue in general, a ladder of the appropriate type and size would most likely be needed and summoned for. And to do this, the conventional way of moving or transporting a ladder within the premises of a facility is by simply lifting and carrying it around manually by hand from one spot to another. This method is typically awkward, tedious, unsafe, and burdensome particularly if the ladder is oversized and the distance of travel involved is considerably far. Thus, users have resorted to using devices that presumably help ease in the process. One example is the use of shoulder straps attached to the ladder. This method is ineffective since it does not really relieve the user from the weight of the ladder. Others have used wheeled devices such as flat carts, tool carts, drywall carts, furniture dollies, and even service tables with wheels but these solutions are all equally awkward, difficult to use, and unable to meet the needs of the industry. Other solutions attempt to install wheels directly on to the ladder or have some kind of wheeled contraption that attach and detach from the ladder, but these solutions fail likewise because, apart from being impractical, their application is limited to only a couple of types of ladders. They are also less desirable because they require assembly and disassembly each use and they are hard to maneuver around once installed and put to use.

SUMMARY

It is desirable to have a ladder dolly apparatus that has the versatility to accommodate various types and sizes of ladders and transports each of them from one spot to another with relative ease and minimal effort. It is also preferable to have a ladder dolly that is readily adapted to the load and does not require further modification to perform its task. It would be advantageous further if the said dolly apparatus can also haul other objects whether in combination with the ladder or by just using the dolly as it is. In order to provide the above advantages, one of the embodiments can be a dolly apparatus, comprising a platform, at least one bar coupled with the platform, and a plurality of casters coupled with the platform. Further, another embodiment can be a ladder dolly apparatus, comprising a platform, two vertical bars coupled with the platform, a handle configured to connect the two vertical bars to each other, a plurality of swivel casters coupled with the platform, a mounting hardware configured to connect the two vertical bars to the platform, and a connecting hardware configured to connect the two vertical bars to the handle, wherein the two vertical bars are extendable to adjust a height of the handle, and the platform comprises a groove on an upper surface of the platform to fix a ladder.

Disclosed is an exemplary embodiment a ladder dolly apparatus, which is made up of the following components: four swivel casters, a solid platform, two rigid bars or railings, and a handle. These components are connected as follows: four swivel casters substantially spaced apart are mounted proximate to the edge at the bottom surface of the platform. On the top surface of the platform, the rigid two bars or railings are securely fastened perpendicularly in the midsection. The bars are optimally spaced apart from each other as they extend upwards to an ideal height where they are solidly joined together horizontally by a rigid handle.

The disclosed ladder dolly may also have one or more of the following:
1) a mechanism allowing adjustment to the height of the handle relative to its distance to the platform in a retracted or extended manner;
2) at least one of the swivel casters is lockable to inhibit movement of the dolly in any direction;
3) the railing and handle assembly can be detachable for packaging and storing purposes;
4) a feature on the handle such as a slight protrusion above it on either or both sides that can be used to hang an object such as a tool belt, a small bag, an extension cord, etc; with the intent to prevent the object from falling or slipping off;
5) hooks along the vertical railings for tie downs;
6) a configuration of three swivel casters instead of four or more the with the center of gravity directed towards the lower middle part of the device;
7) an oval, oblong, round, square, or polygon shaped platform that is optimal for a balanced dolly equipment;

The use of the disclosed ladder dolly is unique when compared with other known devices and solutions because:
it is versatile in a manner that it is readily adapted to fit the various types and sizes of ladders;
it is capable of moving its load with ease in a gliding fashion towards any direction of travel resulting to an efficient handling capability;
it can turn 360 degrees in an instant and make sharp turns in tight spots such as doorways, crowded public areas, cluttered hallways, etc.;
it eliminates the awkwardness of moving a ladder especially the oversized types;
it is compact and requires very little storage space;
it is safer to use;
it helps increase productivity in the workforce;
it is relatively inexpensive to maintain as a part of a facility's standard tooling;
it can be used as a holding and staging device for the most used ladder in the property;
it does not require assembly or disassembly for every usage;
it can be used as auxiliary transport of other objects in conjunction with the ladder;
it has the versatility to function as a regular transport dolly as is for objects that will fit and balance evenly on its platform;

The disclosed ladder dolly is unique in that it is structurally different from other known devices or solutions. More specifically, the disclosed device is unique due to its compact size in relation to the maximum size and weight of load it can carry. Moreover, the unique configuration of the centrally positioned handle of the device creates exceptional handling capability and control of the unit at work. Furthermore, the combination of an optimally shaped platform and swivel casters of sufficient rating form an all-around balanced design which is ideal for numerous transport applications.

This disclosure will now provide a more detailed and specific description that will refer to the accompanying drawings. The drawings and specific descriptions of the drawings, as well as any specific or alternative embodiments discussed, are intended to be read in conjunction with the entirety of this disclosure. The disclosed ladder dolly may, however, be embodied in many different forms and should not be construed as being limited to the embodiments set forth herein; rather, these embodiments are provided by way of illustration only and so that this disclosure will be thorough, complete and fully convey understanding to those skilled in the art.

DETAILED DESCRIPTION OF THE EMBODIMENTS

In its most complete version, the present invention, which is directed to the disclosed ladder dolly, is made up of the following components: (1) four swivel casters of optimal size and duty rating with one or two of the casters to be the lockable type for braking; (2) an oblong or similar polygon shaped solid platform of sufficient thickness and rigidity; (3) two round or square tube bars or railings of the same length with optimal diameter or width; (4) two mounting brackets of optimal size and strength which are either built-in or detachable from the platform; (5) a handle with sufficient grip thickness and supported by a connecting hardware on each end; (6) a lever or push-button mechanism built-in in the handle or between the railing assembly which allows for quick height adjustment of the handle.

Figure 1:
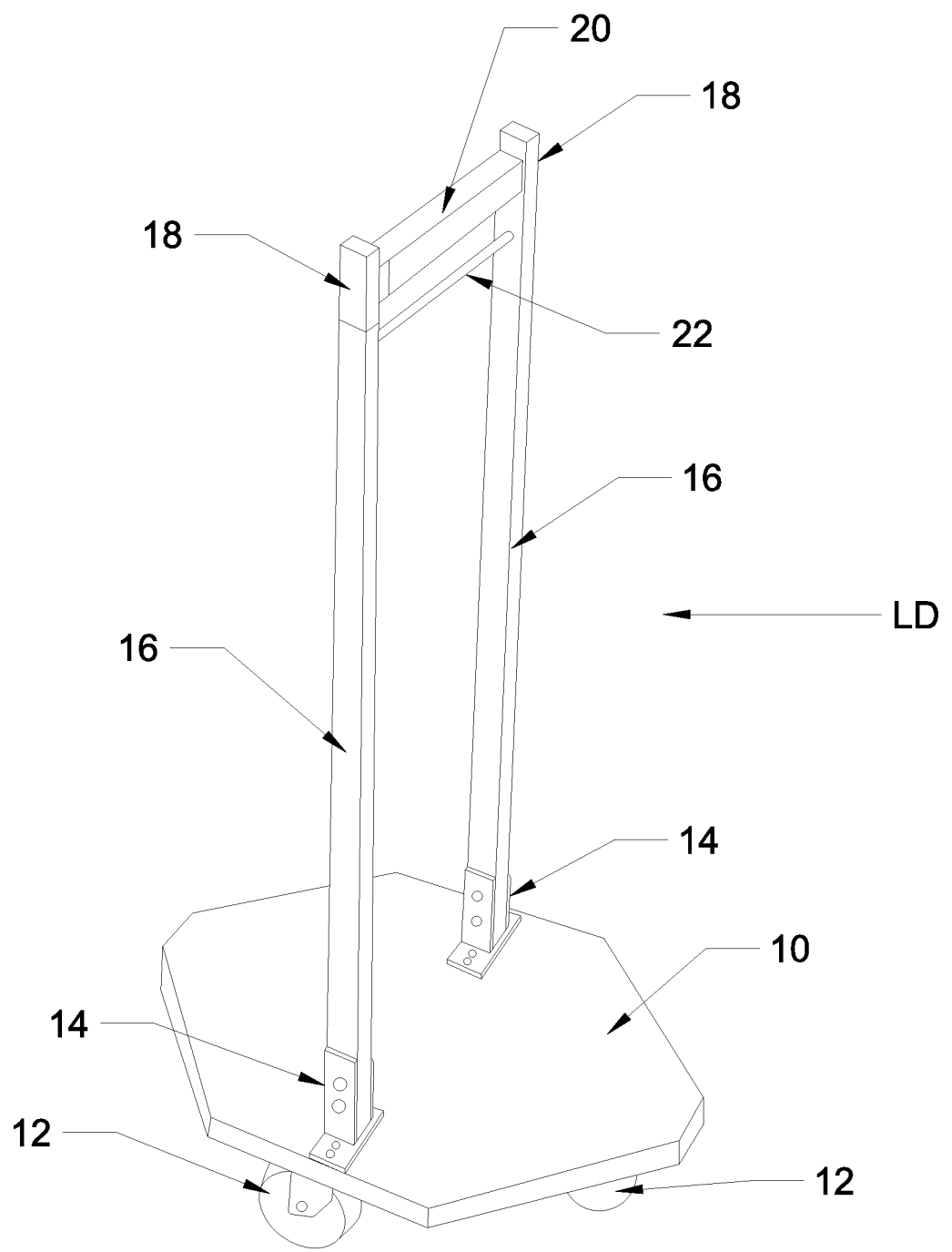
FIG. 1—shows a perspective view of the disclosed ladder dolly.

Referring now to the perspective view in more detail in FIG. 1, there is shown the ladder dolly LD and its core components which consist of a platform 10, a plurality of swivel casters 12, mounting hardware 14, two vertical bars or railings 16, connecting hardware 18, a rigid handle 20, and an adjustment lever mechanism 22. The platform can be in the form of rectangle, diamond, or polygon.

Figure 2:
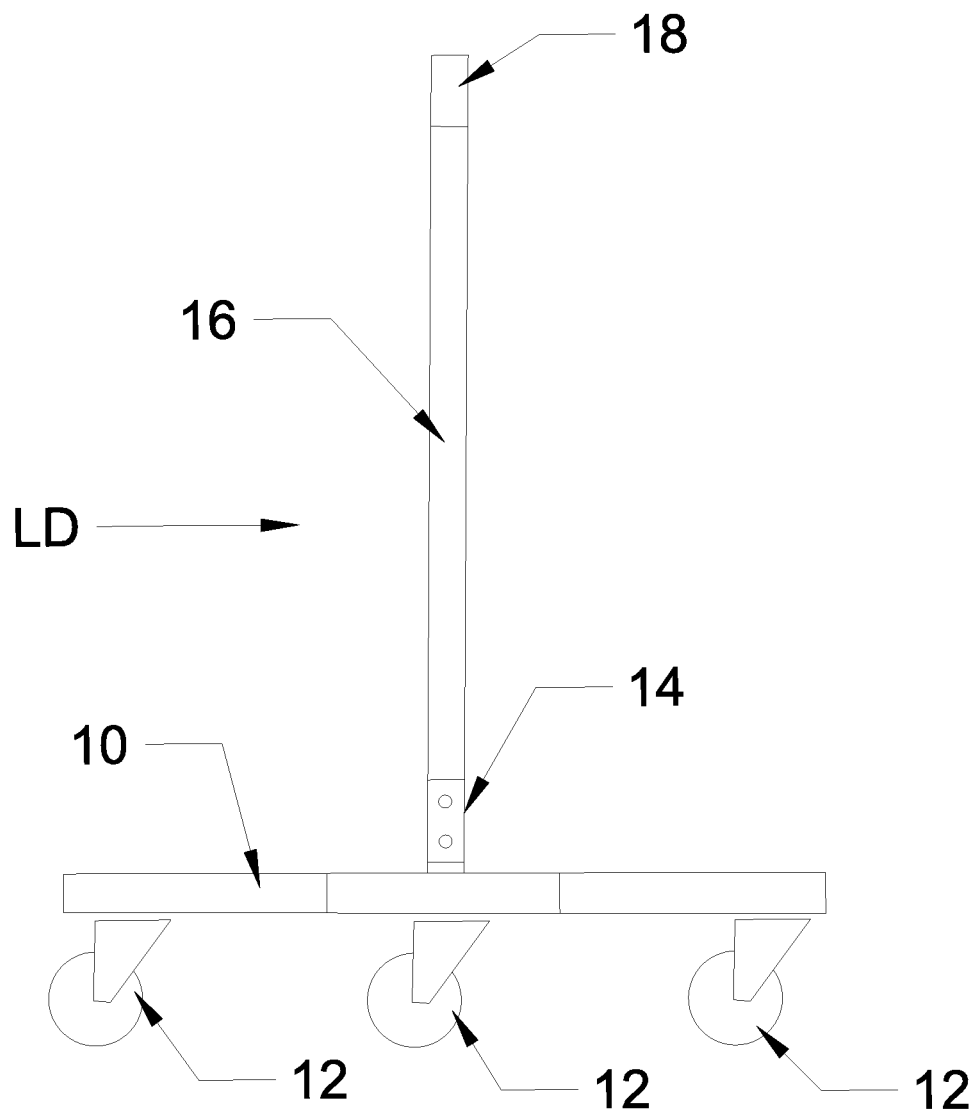
FIG. 2—is a side view of the ladder dolly in FIG. 1.

FIG. 2, which is the side view of the ladder dolly LD, shows a partial view of the swivel casters 12 attached securely at the bottom of the solid platform 10. One side of the railing 16 is shown rigidly mounted on the midsection of the platform 10 using appropriate mounting hardware 14. At the top of the bar or railing 16 is a partial view of the connecting hardware 18 that facilitates the completion of the upper portion of the ladder dolly LD. The bar or railing 16 can be extendable, and the height of the handle is adjustable by the extendable bar.

Figure 3:
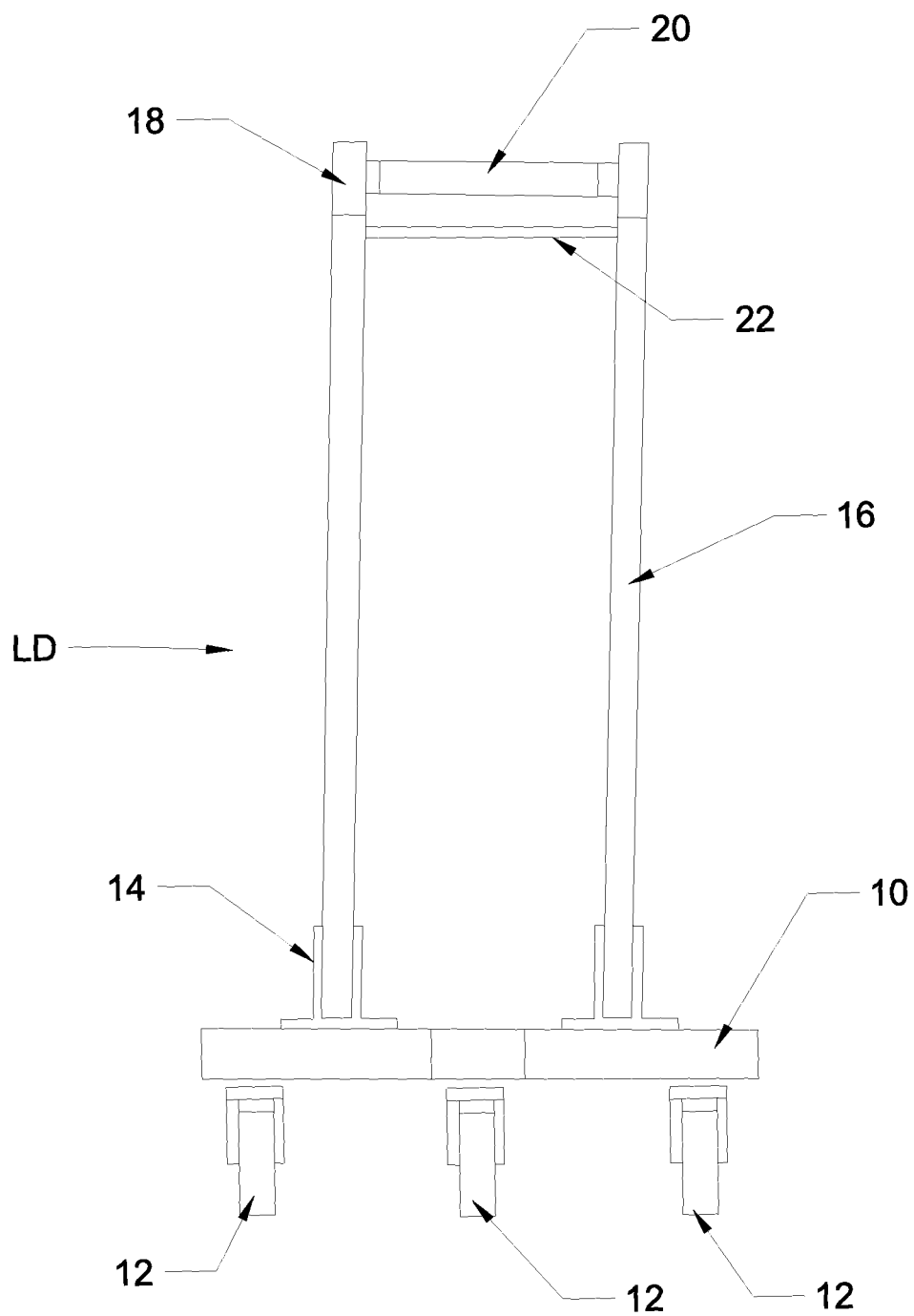
FIG. 3—is a front view of the ladder dolly in FIG. 1.

FIG. 3, which is the front view of the ladder dolly LD, shows the swivel casters 12 attached to the bottom of the platform 10 while rising perpendicularly from the top surface of the platform 10 are the two parallel railings 16 that are sufficiently spaced apart to allow a large-sized ladder to fit and slide in horizontally on its side. The two upright railings 16 are each fastened securely on the platform 10 by a mounting bracket 14 of sufficient rigidity as to prevent the railings 16 from collapsing when in use. As the two railings 16 rise up to an ideal height enough to fit and balance likewise a large-sized ladder horizontally on its side, they are joined together across securely by a rigid handle 20. An appropriate connecting member 18 can be used to terminate and complete the rig handle 20 assembly. A grip or push-button mechanism 22 may also be incorporated to facilitate the adjustment of the height of the handle 20 or of other functions the ladder dolly may have.

Figure 4:
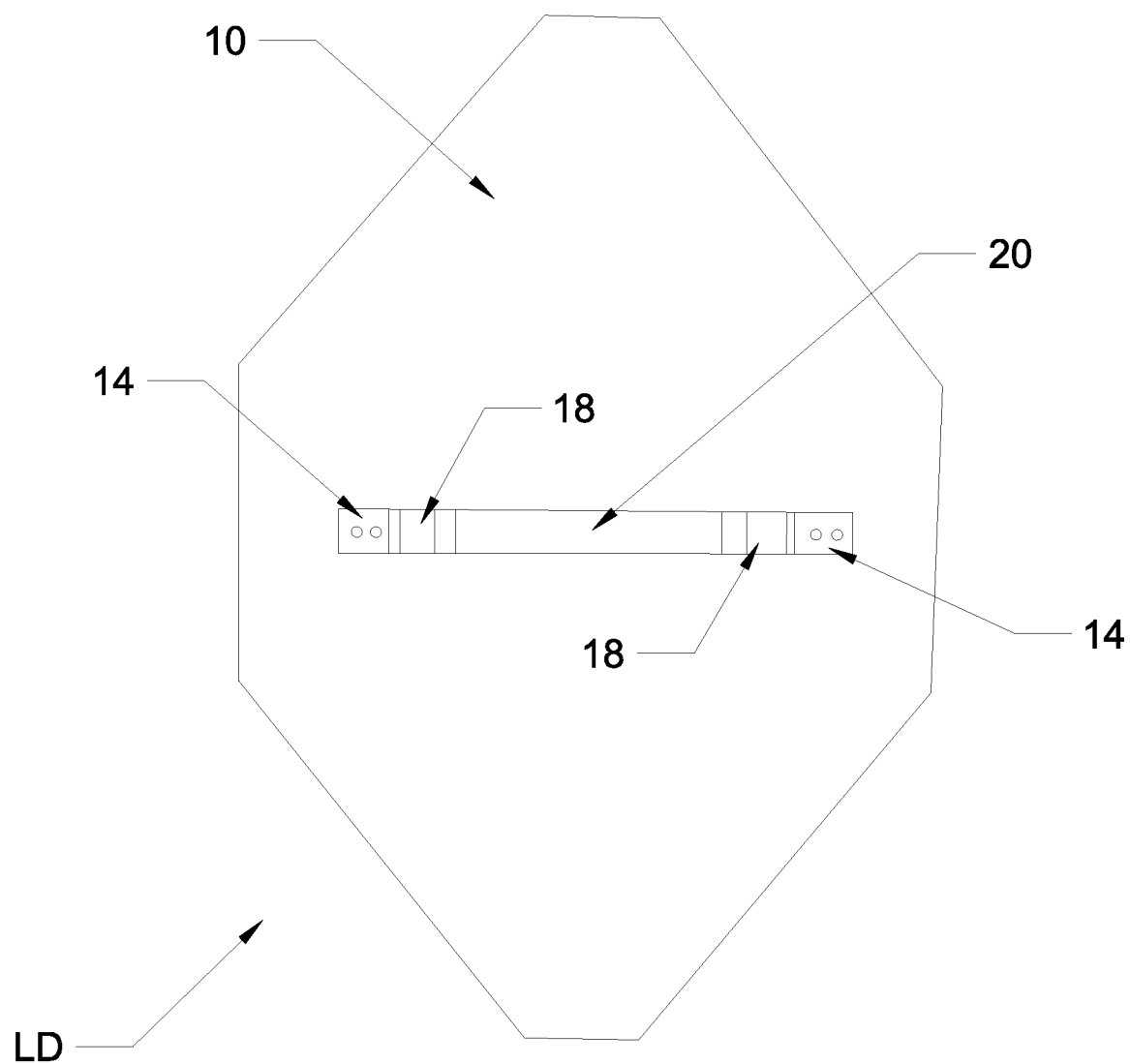
FIG. 4—is a top view of the ladder dolly in FIG. 1.

FIG. 4, which shows the view of the ladder dolly LD from the top, illustrates the orientation of the handle 20 in relation to the platform 10. A partial view of the connecting hardware 18 can also be seen on both ends of the handle 20 that gives its rigid connection to the railings 16 below which, in turn, are connected to the platform 10 through mounting hardware 14.

Figure 5:
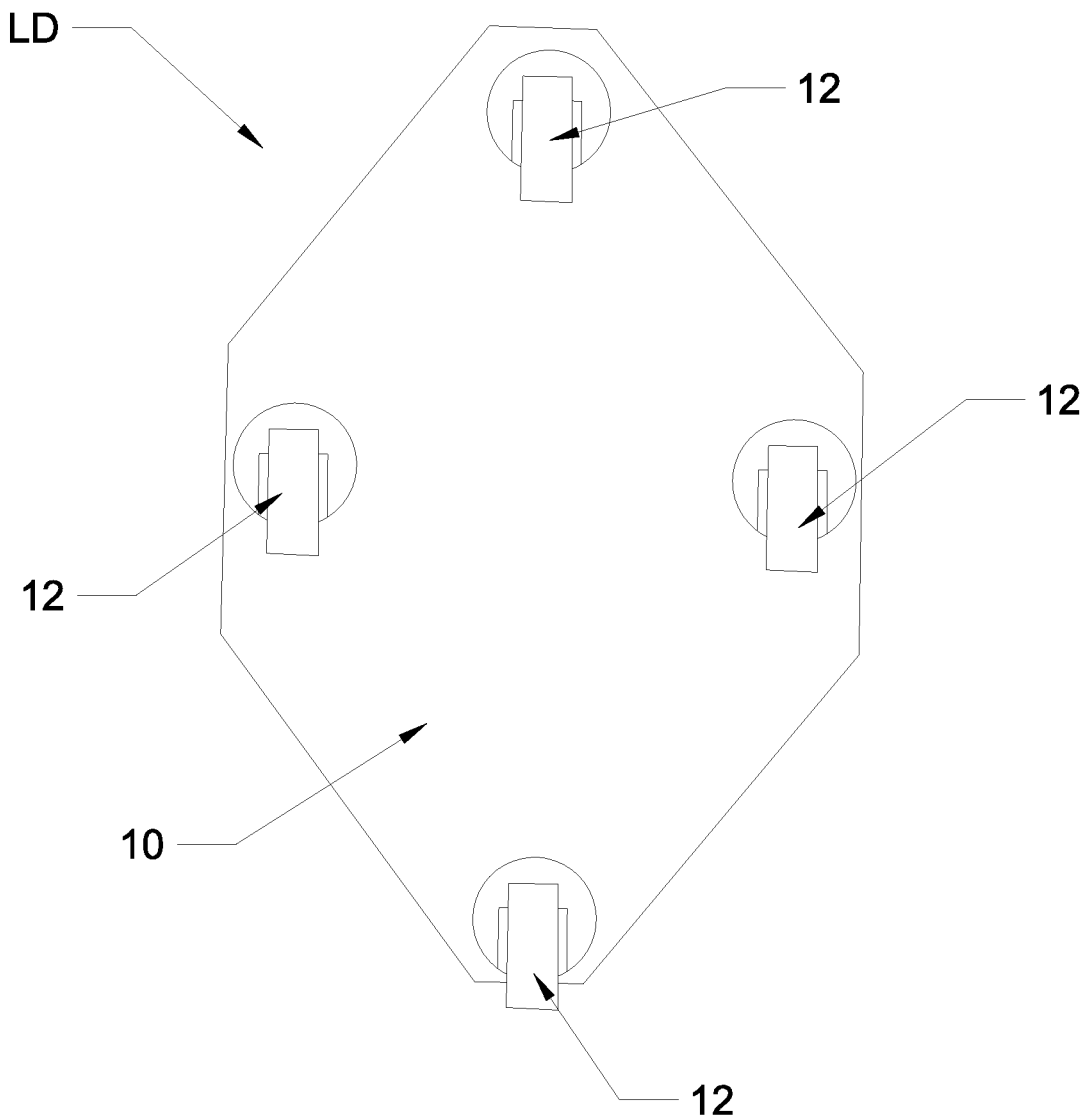
FIG. 5—is an underside view of the ladder dolly in FIG. 1.

FIG. 5 is the undercarriage view of the ladder dolly LD with four swivel casters 12 installed at the bottom of the platform 10 while spaced apart optimally and located proximate to the edge of the platform 10 for optimum balance and stability.

Figure 6:
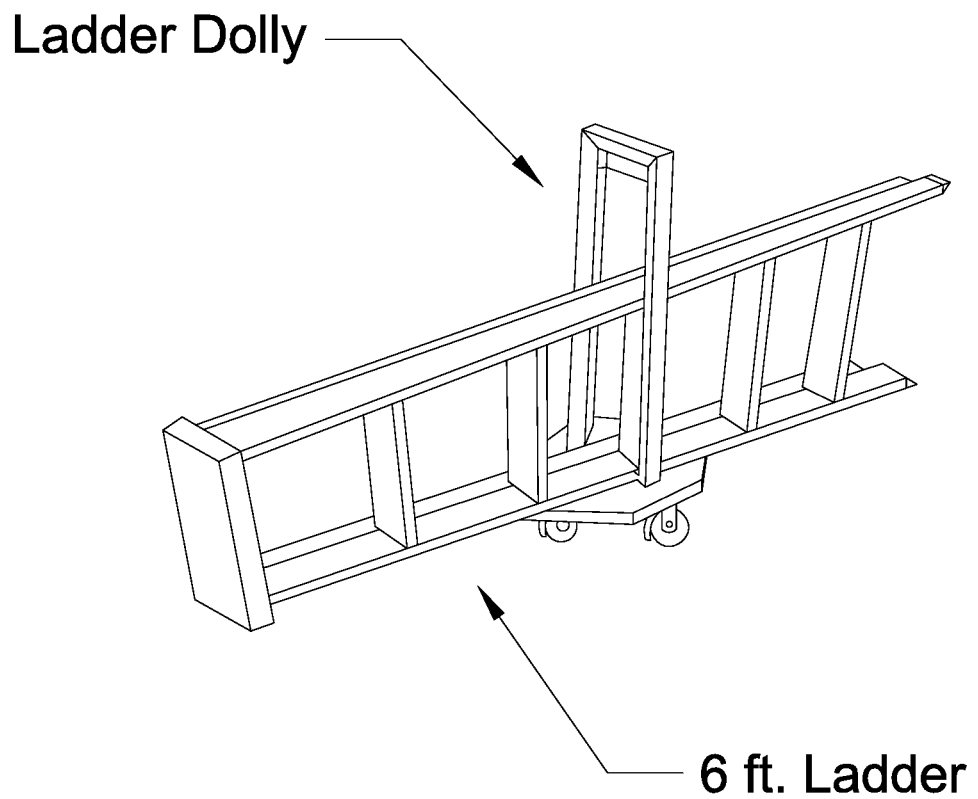
FIG. 6—is a view of the ladder dolly with a sample ladder on board and ready for transport.

FIG. 6 shows a configuration of the disclosed ladder dolly with a sample 6 ft ladder on board and ready for transport. To use the ladder dolly in general, a ladder of choice, e.g. 12 ft A-frame type or 20 ft extension ladder, is simply slid through horizontally while on its side between the two upright railings until it is balanced and placed down in the middle of the platform. The resulting ladder-dolly setup can then be set in motion and moved around any unobstructed direction with ease in a gliding manner through narrow paths and sharp turns while using the top handle for steering. Miscellaneous objects such as tools, parts, materials and the like can be placed strategically on top and/or around the ladder-dolly setup and be transported together with the ladder if needed or desired. Moreover, the invention can also function as a regular form of dolly apparatus as is on its own for any object that will fit and balance on its platform.

Furthermore, construction details of the disclosed device as shown in FIG. 1 through FIG. 6 are that the ladder dolly LD may be of wood or of any other sufficiently rigid and strong material such as high-strength plastic, metal, and the like. Further, the various components of the ladder dolly LD can be made of different materials.

Figure 7:
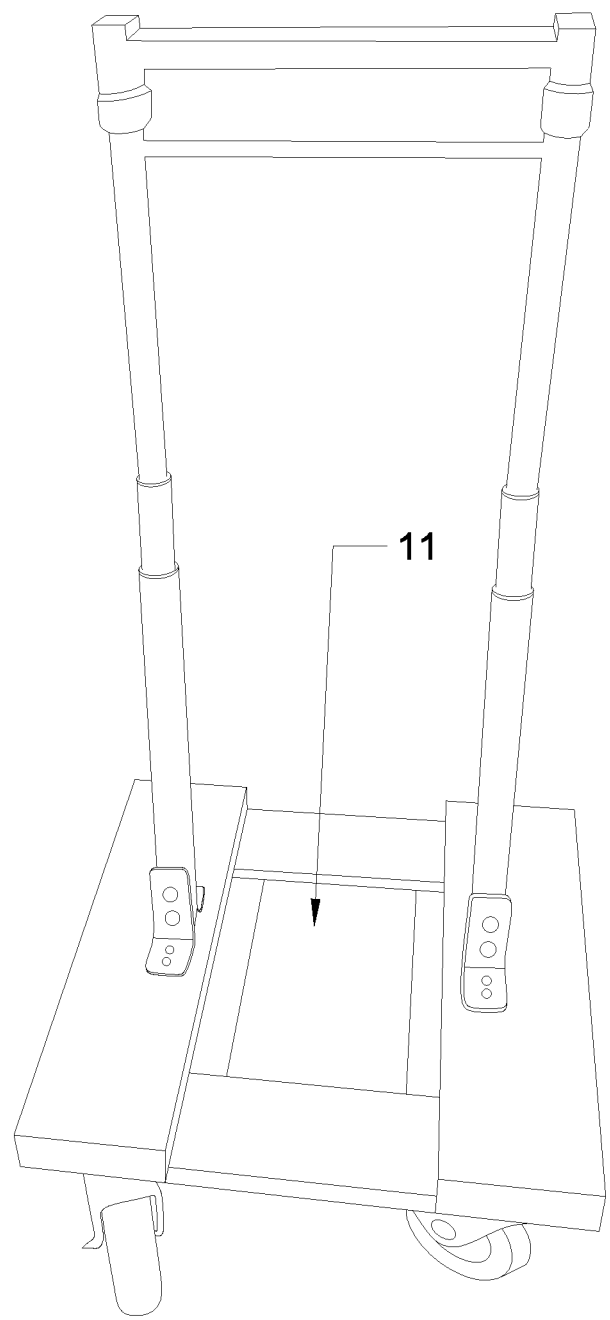
FIG. 7—shows another embodiment of the disclosed ladder dolly.

FIG. 7 shows another embodiment of the disclosed ladder dolly. In FIG. 7, the platform comprises groove 11 on an upper surface of the platform in the direction of length to fix a ladder.

Different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by both this disclosure. It is indeed intended that the scope of this disclosure should be determined by a proper legal interpretation and construction of the disclosure, including equivalents, as understood by those of skill in the art relying upon the complete disclosure present at the time of filing.

What is claimed is:

1. A dolly apparatus, comprising:
a platform,
two bars coupled to a midsection of the platform,
a plurality of casters directly attached to the platform, and
a handle connecting the two bars to each other;
wherein adjustment of a height of the handle is facilitated by a push-button mechanism;
wherein the platform comprises a groove on an upper surface of the platform between the two bars to fix a ladder; and
wherein the platform is in the form of a diamond.

2. The dolly apparatus of claim 1, further comprising a mounting hardware configured to connect the bars to the platform.

3. The dolly apparatus of claim 1, further comprising a connecting hardware connecting the bars to the handle.

4. The dolly apparatus of claim 3, wherein the connecting hardware extends in a vertical direction above the handle forming a space to hang an object.

5. The dolly apparatus of claim 1, wherein the bars are vertical bars.

6. The dolly apparatus of claim 5, wherein the bars have a round or square shape.

7. The dolly apparatus of claim 6, wherein the bars are extendable.

8. The dolly apparatus of claim 1, wherein the platform is a solid platform.

9. The dolly apparatus of claim 1, wherein the handle is a rigid handle.

10. The dolly apparatus of claim 1, wherein a number of the plurality of casters is four.

11. The dolly apparatus of claim 10, wherein the plurality of casters are a swivel caster.

12. The dolly apparatus of claim 1, wherein a number of the plurality of casters is at least three and two of the plurality f casters are positioned in the midsection of the platform.

13. The dolly apparatus of claim 1, wherein a bottom of the groove is positioned above any one of the plurality of casters.

14. A doily apparatus, comprising:
a platform,
two vertical bars attached to a midsection of the platform,
a handle connecting the two vertical bars to each other,
a plurality of swivel casters coupled with the platform,
a mounting hardware configured to connect the two vertical bars to the platform, and
a connecting hardware connecting the two vertical bars to the handle,
wherein the two vertical bars are extendable to adjust a height of the handle, and the platform comprises a groove on an upper surface of the platform to fix a ladder;
wherein adjustment of the height of the handle is facilitated by a push-button mechanism;
wherein the groove on the upper surface of the platform is between the two bars to fix a ladder; and
wherein the platform is in the form of a diamond.

15. The dolly apparatus of claim 14, wherein a bottom of the groove is positioned above any one of the plurality of casters.

* * * * *